(12) United States Patent
Disley (10) Patent No.: US 12,151,608 B2
(45) Date of Patent: Nov. 26, 2024

(54) VEHICLE GRILLE

(71) Applicant: Volvo Truck Corporation, Gothenburg (SE)

(72) Inventor: Jonathan Disley, Åsa (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/383,145

(22) Filed: Oct. 24, 2023

(65) Prior Publication Data

US 2024/0157870 A1 May 16, 2024

(30) Foreign Application Priority Data

Nov. 10, 2022 (EP) .................................... 22206640

(51) Int. Cl.
| | | |
|---|---|---|
| *B60Q 1/50* | (2006.01) | |
| *B60Q 1/00* | (2006.01) | |
| *B60Q 1/28* | (2006.01) | |
| *B60R 19/52* | (2006.01) | |
| *G06K 19/04* | (2006.01) | |
| *G06K 19/06* | (2006.01) | |

(52) U.S. Cl.
CPC ............ *B60Q 1/503* (2013.01); *B60Q 1/0011* (2013.01); *B60Q 1/28* (2013.01); *B60R 19/52* (2013.01); *G06K 19/041* (2013.01); *G06K 19/06037* (2013.01)

(58) Field of Classification Search
CPC ........ B60Q 1/503; B60Q 1/0011; B60Q 1/28; B60Q 1/2661; B60Q 1/5035; B60R 19/52; B60R 2019/525; G06K 19/041; G06K 19/06037; G06K 19/06121; G06K 19/06159; G07B 15/06; G08G 1/0175; G09F 13/044; G09F 21/048
See application file for complete search history.

(56) References Cited

U.S. PATENT DOCUMENTS

| | | |
|---|---|---|
| 6,805,389 B1 | 10/2004 | Schellenberg |
| 10,059,256 B1 | 8/2018 | Diedrich |
| 2019/0271458 A1 | 9/2019 | Brown et al. |
| (Continued) | | |

FOREIGN PATENT DOCUMENTS

| | | |
|---|---|---|
| CN | 203063857 U | 7/2013 |
| CN | 110843713 A | 11/2019 |
| (Continued) | | |

OTHER PUBLICATIONS

European Search Report for European Patent Application No. 22206640.9, mailed May 3, 2023, 9 pages.

*Primary Examiner* — Jamara A Franklin
(74) *Attorney, Agent, or Firm* — Sage Patent Group (57) ABSTRACT

The present disclosure relates to a vehicle grille configured to be mounted to a front of a vehicle body, wherein the vehicle grille comprises a grating structure through which air is receivable into the vehicle, wherein at least a portion of said grating structure is shaped as a scannable matrix structure forming a code pattern. The present disclosure also relates to a vehicle comprising such a vehicle grille. The present disclosure further relates to a data access system which comprises such a vehicle and a remote server containing data associated with said vehicle, said data being accessible by a camera-equipped communication device, such as a mobile phone, when scanning said scannable matrix structure.

12 Claims, 5 Drawing Sheets

(56) References Cited

U.S. PATENT DOCUMENTS

2021/0055141 A1 2/2021 Ryan et al.
2021/0261045 A1 8/2021 Cha et al.
2021/0364145 A1 11/2021 Lee
2022/0203824 A1 6/2022 Liu et al.

FOREIGN PATENT DOCUMENTS

| CN | 210852221 U | 6/2020 |
| DE | 202005012542 U1 | 11/2005 |
| DE | 202022001988 U1 | 10/2022 |
| JP | 2020059445 A | 4/2020 |
| WO | 2008007076 A1 | 1/2008 |
| WO | 2022199727 A1 | 9/2022 |

VEHICLE GRILLE

CROSS REFERENCE TO RELATED APPLICATION

This application claims foreign priority to European Application No. 22206640.9 filed on Nov. 10, 2022, the disclosure and content of which is incorporated by reference herein in its entirety.

TECHNICAL FIELD

The present disclosure relates to a vehicle grille configured to be mounted to a front of a vehicle body. The present disclosure also relates to a vehicle comprising such a vehicle grille. The present disclosure further relates to a data access system comprising such a vehicle. The disclosure can be applied in heavy-duty vehicles, such as trucks, buses and construction equipment. Although the disclosure may be described with respect to a particular vehicle, this disclosure is not restricted to any particular vehicle.

BACKGROUND

Vehicle grilles are usually provided to cover an opening in the body of a vehicle to allow air to enter or exit. Vehicle grilles at the front of the vehicle may form a protecting structure, such as for a cooling system and/or an engine of the vehicle. Vehicle manufacturers have differently designed grilles, creating visual recognizable appearances which distinguish them from the grilles of other vehicle manufacturers. Thus, a vehicle grille may form part of a vehicle manufacturer's brand identity.

SUMMARY

The present disclosure is based on the realization that a vehicle grille may be provided which, in addition to having the traditionally functionalities, may also be used for more modern functionalities, such as connectivity to digital services.

According to a first aspect of the disclosure, there is provided a vehicle grille configured to be mounted to a front of a vehicle body, wherein the vehicle grille comprises a grating structure through which air is receivable into the vehicle, wherein at least a portion of said grating structure is shaped as a scannable matrix structure forming a code pattern. The first aspect of the disclosure may seek to improve the traditional use of vehicle grilles by adding further functionality. A technical benefit may include the possibility to access data associated with the vehicle or the vehicle manufacturer by scanning the scannable matrix structure. Such data may include services provided by the vehicle manufacturer on web sites or in APPs, or such data may include vehicle identification data, e.g. VIN, etc. Another technical benefit may include the possibility to quickly gain access to information that may be relevant for a vehicle owner, driver, workshop personnel, law enforcement officer, etc.

In some examples, said grating structure is formed by differently inclined surfaces such that when they are illuminated, surfaces that are inclined at a first angle are seen as light parts of the code pattern, while surfaces inclined at a different second angle are seen as dark parts of the code pattern. A technical benefit may include that by forming the surfaces in different angles, for example so that surfaces inclined at the first angle will normally reflect light coming from one direction while surfaces inclined at the second angle will be shadowed from the light coming in said one direction, and there is therefore no need for any additional colouring or use of different materials to create the code pattern.

In some examples, the grille has a back side intended to face inwardly towards the vehicle when mounted on a vehicle, and a front side intended to face in the opposite direction, forwardly away from the vehicle, wherein said inclined surfaces are configured to present said light and dark parts of the code pattern when the front side of the grille is illuminated by natural or artificial light. A technical benefit may include a conveniently obtainable reading of the code pattern when a scanning device is located in front of, and directed towards, the vehicle. This may be done at daylight without any additional lighting, or at dusk or night time by directing a light (for example from a cell phone or external lamp). Thus, no additional activation of internal auxiliary systems of the vehicle is needed, and the vehicle may even be completely powered-off/shut down.

In some examples, the grating structure comprises a pattern of openings through which air can pass and closed areas through which air cannot pass, wherein one of said openings and said closed areas form light parts of the code pattern, while the other one of said openings and said closed areas form dark parts of the code pattern. A technical benefit may include, similarly to above, that no internal auxiliary systems of the vehicle are required for providing the coded pattern. The coded pattern of the scannable matrix structure may be conveniently obtainable by selecting the placement of the openings, thereby still providing the traditional function of allowing air to enter into the vehicle body.

In some examples, said grating structure comprises a plurality of exchangeable, removable, and/or rearrangeable polygonal elements, such as square-shaped elements, enabling the scannable matrix structure to be modified to form a different code pattern. A technical benefit may include that such polygonal elements (e.g. square-shaped or other rectangular shapes) may suitably be used to present light or dark parts of a code pattern. By allowing rearrangement, different code patterns may be created as desired. For instance, in connection with a scheduled vehicle service, the polygonal elements may be rearranged to form a different code pattern in order to direct a scanning device to a new Internet web site which is now more relevant than a web site to which the previous code pattern was linking.

In some examples, said polygonal elements are in the form of square-shaped tiles fitted to mating receiving areas of the grating structure. A technical benefit may include that square-shaped tiles are suitable for creating a scannable matrix structure forming a code pattern. For instance, some matrix code patterns in which square-shaped bits or pixels are used to form the code patterns, and for which square-shaped tiles may be used to represent such square-shaped bits include QR code, Aztec code, NexCode, Qode, etc.

In some examples, said polygonal elements cover some of said openings to form some of said closed areas, wherein said polygonal elements are removable to turn closed areas into openings and/or rearrangeable to turn openings into closed areas. A technical benefit may include that a code pattern can conveniently be modified if desired, for instance, to direct a scanner to different informational content than what was previously desire. The polygonal elements, may for instance, be in the form of the above-mentioned square-shaped tiles.

In some examples, said scannable matrix structure is in the form of a QR code pattern. Although there are various conceivable code patterns, some of which have been mentioned above, a technical benefit of a QR code pattern may include that many scanning devices are already prepared and programed to read QR codes, thereby providing a high degree of accessibility.

According to a second aspect of the disclosure, there is provided a vehicle comprising a vehicle grille according to the first aspect, including any examples thereof. The second aspect of the disclosure may have the corresponding technical benefits as vehicle grille of the first aspect, including any examples thereof.

In some examples, the vehicle comprises, at the front of the vehicle, left and right vehicle lights, wherein said grille is centred at the front of the vehicle between said left and right vehicle lights, wherein the vehicle further comprises a light guide for guiding light from at least one of said left and right vehicle lights to said grating structure of the grille so as to illuminate said grating structure. This may, for example, improve the visibility of said scannable matrix structure. A technical benefit may thus include that even under dark conditions, the code pattern may be made visible. Another technical benefit may include that using light, such as by bleeding off some of the light from vehicle lights (for example from headlights), no separate light source needs to be installed for improving the visibility of the scannable matrix structure.

In some examples, said light guide is configured to direct light to different discrete areas of the grating structure, wherein areas receiving light by the light guide form light parts of the code pattern, while other areas not receiving light by the light guide form dark parts of the code pattern. A technical benefit may include that from a production point the same grille can be used for different vehicles, models, etc., and the selection of different code patterns may be achieved by simply selecting which areas to illuminate by the guided light.

According to a third aspect of the disclosure, there is provided a data access system, comprising:
 a vehicle according to the second aspect, including any example thereof, and
 a remote server containing data associated with said vehicle, said data being accessible by a camera-equipped communication device, such as a mobile phone, when scanning said scannable matrix structure.

The third aspect of the disclosure may seek to facilitate access to vehicle related information, by allowing the vehicle grille of the vehicle to be scanned and thereby providing access to data stored at a remote server. The third aspect of the disclosure may have the corresponding technical benefits as vehicle of the second aspect, including any examples thereof.

In some examples, the data access system further comprises a local scanning device, such as installed at a workshop or a toll station, wherein the local scanning device is configured to scan said scannable matrix structure upon arrival of the vehicle to the local scanning device, thereby providing access to said data associated with said vehicle. A technical benefit may include that such local scanning devices may be appropriately provided identifying points for, e.g. automatic reading of vehicle data. For instance, when the vehicle passes a tool station or enters a workshop area the code pattern may be scanned and relevant data accessed for further processing, such as debiting, workshop service preparation, etc.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of embodiments of the disclosure cited as examples.

In the drawings.

DETAILED DESCRIPTION OF EXAMPLE EMBODIMENTS OF THE DISCLOSURE

Aspects set forth below represent the necessary information to enable those skilled in the art to practice the disclosure.

Vehicle grilles allow air to enter or exit into a vehicle body while forming a protecting structure. Although different vehicle manufacturers design the grilles in different ways in order to create an aesthetically pleasing visual appearance, it is noteworthy that apart from the air flow functionality, the provision of any additional technical functionality has until now been ignored. Considering the awareness of the multitude of different designs that are conceivable for creating a vehicle grille, the inventor of the present disclosure has realized that the great variability in design may be taken advantage of in order to provide additional technical functionality to the vehicle grille. The inventor has realized that a vehicle grille may be used not only for aesthetical distinction, but also for providing different coded information. In particular, the inventor has realized that by forming the vehicle grille, or at least a part of it, in the shape of a scannable code, any suitable coded information may be accessible to the person or device scanning the code. Thus, the vehicle grille will be designed with dual functionalities (air flow and coded information), and the design will depend on the coded information that you want to convey to a device that is scanning the vehicle grille.

Figure 1:
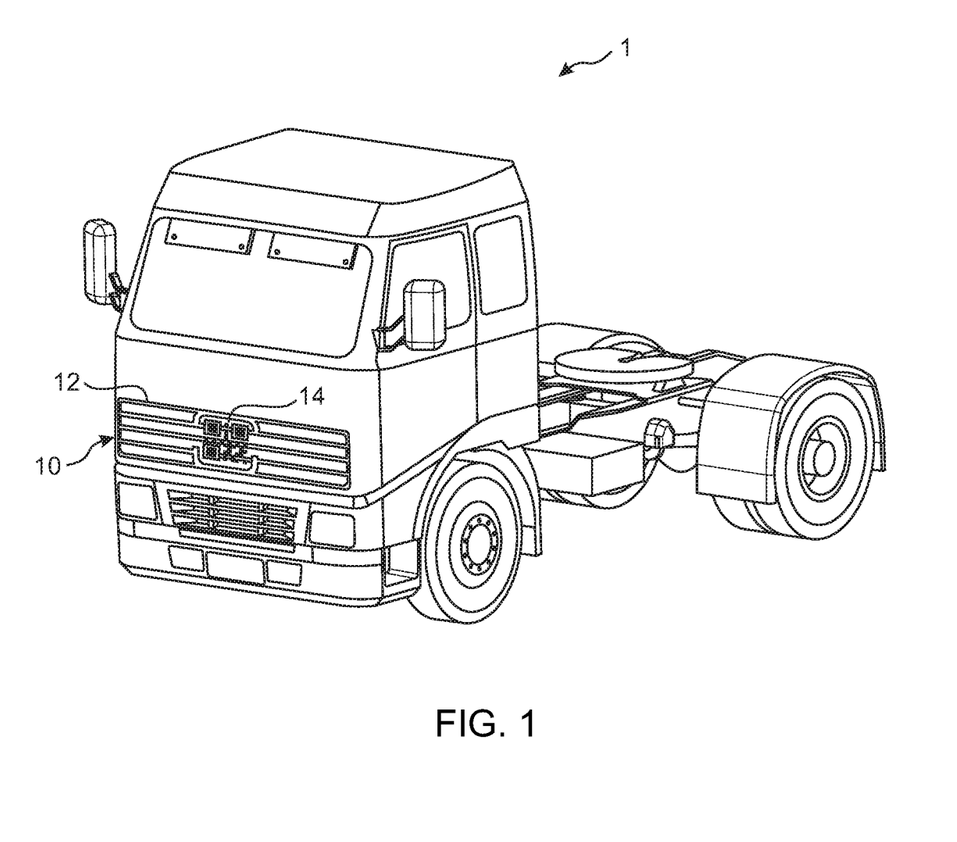
FIG. 1 illustrates a vehicle according to one example of this disclosure.

FIG. 1 illustrates a vehicle 1 according to one example of this disclosure. The exemplary illustration in FIG. 1 shows a heavy-duty vehicle 1. More specifically FIG. 1 shows a vehicle 1 in the form of a tractor unit for towing a trailer unit (not shown), which together may make up a semitrailer vehicle. However, the teachings of the present disclosure are applicable to other types of vehicles as well. For instance, the vehicle may be a different type of vehicle for cargo transport, such as a truck, or a truck with a dolly unit arranged to tow a trailer unit, etc. Other exemplary vehicles include buses, construction equipment, and even passenger cars. The vehicle 1 may be operated by a driver or it may be an autonomous vehicle.

A vehicle grille 10 is mounted to the front of the vehicle body. The vehicle grille 10 comprises a grating structure 12 through which air is receivable into the vehicle 1. At least a portion of the grating structure 12 is shaped as a scannable matrix structure 14 forming a code pattern. In the illustrated example a centre portion of the grating structure 12 has been shaped as a scannable matrix structure 14, however, it should be understood that in other exemplary embodiments, a lateral portion of the grating structure 12 may form said scannable matrix structure. Furthermore, although FIG. 1 illustrates that a relatively small area such as less than 30% of the grating structure 12 is formed to present a code pattern, in other exemplary embodiments, a larger area of the grating structure, such as 30-70% of the grating structure may be formed to present the coded pattern. In fact, it is conceivable, in some examples, to form a vehicle grille having the entire grating structure formed as a code pattern. This is illustrated in FIG. 2.

Figure 2:
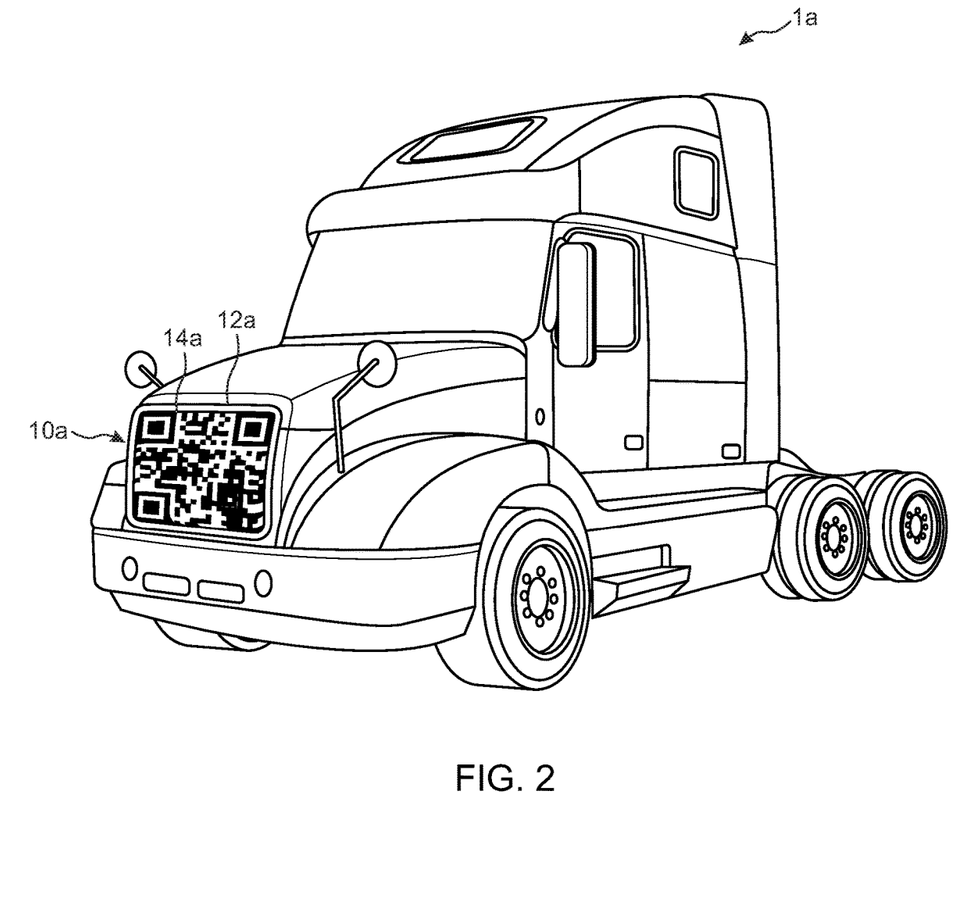
FIG. 2 illustrates a vehicle according to another example of this disclosure.

FIG. 2 illustrates a vehicle 1a according to another example of this disclosure. Similarly to the vehicle 1 in FIG. 1, the vehicle 1a in FIG. 2 is illustrated as a heavy-duty vehicle 1a in the form of a tractor unit, but as already mentioned, the teachings of the present disclosure may be applicable to other types of vehicles as well. The vehicle 1a comprising a vehicle grille 10a mounted to the front of the vehicle body. The vehicle grille 10a comprises a grating structure 12a through which air is receivable into the vehicle 1a. Substantially the entire grating structure 12a is shaped as a scannable matrix structure 14a forming a code pattern.

With reference to either one of FIG. 1 and FIG. 2, a benefit of shaping at least a portion of the grating structure 12, 12a into a scannable matrix structure 14, 14a forming a code pattern, is that that code pattern is presented by design. In other words, there is no need for separate electronics for generating the code onto the grille 10, 10a, or electronic panels for presenting an electronically generated code. Instead, the code pattern may be a purely mechanically designed matrix structure 14, 14a presenting a code pattern.

The code pattern formed by the scannable matrix structure 14, 14a may suitably form a two-dimensional barcode. Thus, the code pattern may vary in two dimensions, for example two orthogonal directions, x and y. The variation may be accomplished by presenting dark and light portions in different arrangements in the two directions. The dark and light portions, may be regarded as "bits", "pixels", "fields" or "cells" of the code pattern. The dark and light portions may, for example be arranged in a rectangular or square grid arrangement. In FIG. 1 and FIG. 2, the scannable matrix structure 14, 14a of the respective grating structure 12, 12a has been illustrated as forming a QR code pattern. However, it should be understood that any other suitable code pattern is conceivable, such as Aztec code, NexCode, Qode, etc. As will be discussed in more detail with respect to other drawing figures, there are various conceivable ways to shape a grating structure which, by design, can present dark and light portions.

The vehicle grilles 10, 10a mounted to the vehicle 1, 1a in FIG. 1 and FIG. 2 may be configured as any one of the exemplary vehicle grilles discussed in this disclosure, such as the examples that will now be discussed in connection with other drawing figures.

Figure 3:
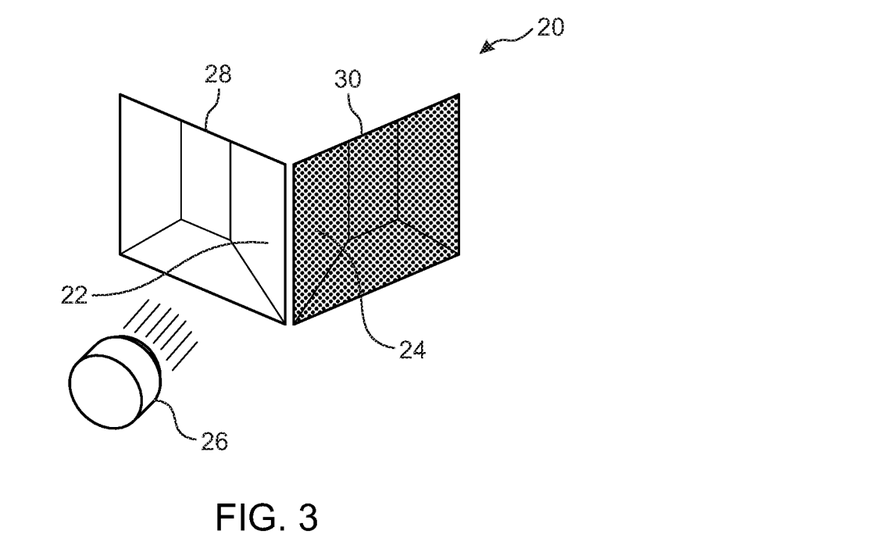
FIG. 3 illustrates schematically portions of a grating structure of a vehicle grille according to one example of this disclosure.

FIG. 3 illustrates schematically portions 20 of a grating structure of a vehicle grille according to one example of this disclosure. It should be noted that FIG. 3 is a very schematic and simple illustration, the purpose of which is to convey a simple understanding of one way to present the code pattern. As illustrated in FIG. 3, the grating structure may be formed by differently inclined surfaces 22, 24 such that when they are illuminated, surfaces 22 that are inclined at a first angle (or at a first range of angles) will be seen as light parts of the code pattern, while surfaces 24 inclined at a different second angle (or at a different second range of angles) will be seen as dark parts of the code pattern. In this example, an artificial light 26 is illuminating the grating structure, however, the same principle is true for natural light, such as sunlight.

As illustrated in FIG. 3, some parts 28 of the grating structure may be arranged and angled such that when they are illuminated, they will reflect light and will thereby be seen as light parts 28 of the code pattern. Other parts 30 of the grating structure may be differently angled so that they will be shadowed and therefore seen as dark parts 30 of the code pattern. Both the light parts 28 and the dark parts 30 may, however, admit air to flow into the vehicle. As natural light will oftentimes come from above the vehicle rather than from below the vehicle, the dark parts 30 may, for example, be provided by inclining surfaces downwardly towards the ground, so that no or only a small amount of light will be reflected by those surfaces. Other surfaces may instead be directed straight ahead or even upwardly, so that they in most cases will reflect a larger amount of light, and therefore be seen as the light parts 28 of the code pattern.

Suitably, the vehicle grille may be produced so that it has an intended orientation when being mounted to a vehicle. The vehicle grille may thus have a dedicated back side intended to face inwardly towards the vehicle when mounted on a vehicle, and a front side intended to face in the opposite direction, forwardly away from the vehicle. Therefore, the inclined surfaces 22, 24 may suitably be configured to present said light parts 28 and dark parts 30 of the code pattern when the front side of the grille is illuminated by natural or artificial light 26.

Figure 4:
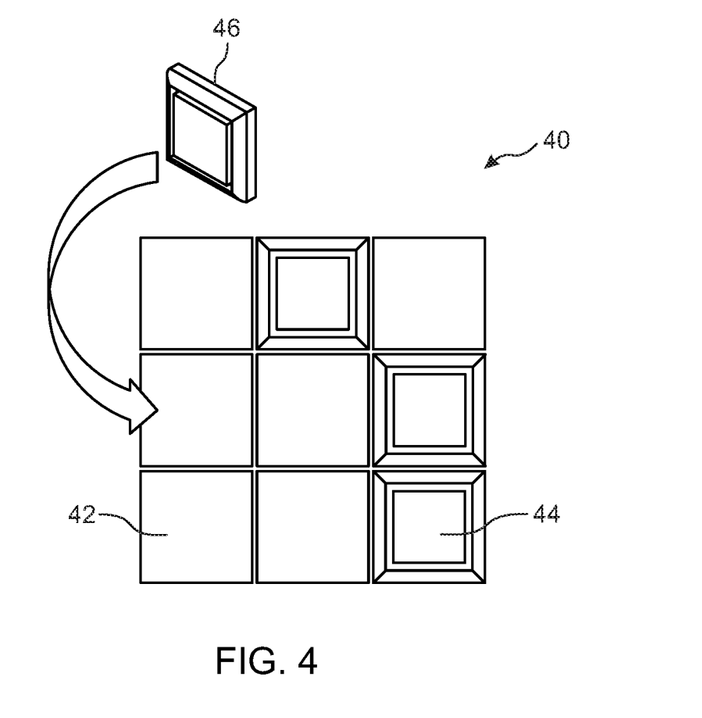
FIG. 4 illustrates schematically portions of a grating structure of a vehicle grille according to another example of this disclosure.

FIG. 4 illustrates schematically portions 40 of a grating structure of a vehicle grille according to another example of this disclosure. In this exemplary embodiment, the grating structure comprises a pattern of openings 42 through which air can pass and closed areas 44 through which air cannot pass. One of said openings 42 and said closed areas 44 may form light parts of the code pattern, while the other one of said openings 42 and said closed area 44 may for dark parts of the code pattern. For instance, in some examples the open areas 42 may form dark parts, while the closed areas 44, may suitably be made in a light colour forming the light areas. Conversely, in other examples, it would be conceivable to illuminate the scannable matrix structure from behind, in which case the openings 42 may be lit up and appear brighter than the closed areas 44, which would suitably be made from a dark colour material. The back of the grille may be illuminated with any suitably light source to achieve such an effect. For instance, it may be a light source dedicated to this functionality, or an already existing light source from which light may be guided to the back of the vehicle grille.

As further illustrated in FIG. 4, in at least some examples, the grating structure may comprise a plurality of exchangeable, removable and/or rearrangeable polygonal elements 46. In FIG. 4 the polygonal elements 46 are formed as square-shaped elements, although other shapes such as rectangular elements may also be conceivable. The polygonal elements 46 enable the scannable matrix structure to be modified to form a different code pattern. As illustrated by the arrow in FIG. 4, a polygonal element 46 is being added to the grating structure, thereby changing one of the openings 42 into a closed area 44, and thus for example changing a dark part into a light part, forming a different code pattern. Similarly, one or more of the already provided polygonal elements 46 may be removed to modify a closed area 44 into an opening 42, thereby further changing the code pattern. In this way, it is possible to update, or prepare, a vehicle grille which a code pattern as desired, in order to guide a scanning device to relevant information as desired.

As exemplified in FIG. 4, the polygonal elements 46 may suitably be in the form of squares-shaped tiles which can be fitted to mating receiving areas of the grating structure. In this example, when a tile has been fitted to a mating receiving area it will cover an opening 42 of the vehicle grille. Thus, in some examples of this disclosure the polygonal elements 46 may cover some openings 42 to form some of said closed areas 44, wherein said polygonal elements 46 are removable to turn closed areas 44 into openings 42 and/or rearrangeable to turn openings 42 into closed areas 44.

Although tiles have been illustrated in FIG. 4, other components may also be conceivable to form said polygonal elements 46. In some examples of this disclosure, the polygonal elements 46 may not necessarily be intended to be removably arranged to the grating structure, but may be intended to remain in place once mounted. For instance, in a factory, different models may be provided with different code patterns, but each model may be based on a common initial grating structure. Then, for different models, the polygonal elements 46 may be placed in respective patterns to form scannable matrix structures associated with respective vehicle models. The different scannable matrix structures, thus forming different codes, may for example guide a scanning device that scans the scannable matrix structure, to a respective online instruction manual or user guide for each vehicle model.

For simplicity, only 9 bits or pixels of the code pattern has been shown in FIG. 4. It should, however, be understood that the code pattern, irrespective of which one of the herein discussed examples is used for presenting it, may have many more bits/pixels, for example several hundreds or even several thousands.

Figure 5:
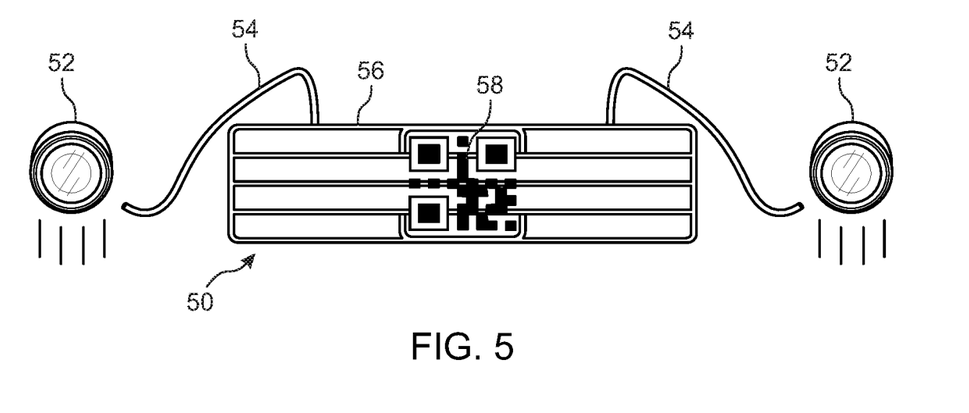
FIG. 5 illustrates a vehicle grille according to one example of this disclosure.

FIG. 5 illustrates a vehicle grille 50 according to one example of this disclosure. As illustrated very schematically in FIG. 5, at the front of a vehicle (such as the vehicle 1 of FIG. 1, but could also be implemented for the vehicle 1a in FIG. 2), there may be left and right vehicle lights 52 (e.g. headlights). The grille 50 may be centred at the front of the vehicle between the left and the right vehicle lights 52, however, the grille 50 does not necessarily have to be at the same vertical level as said left and right vehicle lights 52. As illustrated in FIG. 5, the vehicle may comprise a light guide 54 for guiding light from at least one of said left and right vehicle lights 52 to a grating structure 56 of the grille 50 so as to illuminate the grating structure 56. Thus, some of the light that is anyway provided by the left and right vehicle lights 52, may be captured and guided by the light guides 54. In FIG. 5 two light guides 54 are illustrated, one from each one of the two lights 52. However, in other examples, there may be only one light guide 54. The light may suitably be guided and possibly divided into several light guide parts to light up different parts of the grating structure 56, to form a scannable matrix structure 58 forming a code pattern. The lit-up parts may for example be light parts of the code pattern, whereas non-lit parts may be perceived as dark parts of the code pattern. Thus, in at least some examples, said at least one light guide 54 may be configured to direct light to different discrete areas of the grating structure 56, wherein areas receiving light by the light guide form light parts of the code pattern, while other areas not receiving light by the light guide form dark parts of the code pattern. Each light guide 54 may suitably be guided to the back of the vehicle grille 50 or to interior parts of the vehicle grill 50 to light up different discrete area of the grating structure 56 from behind or internally.

Figure 6:
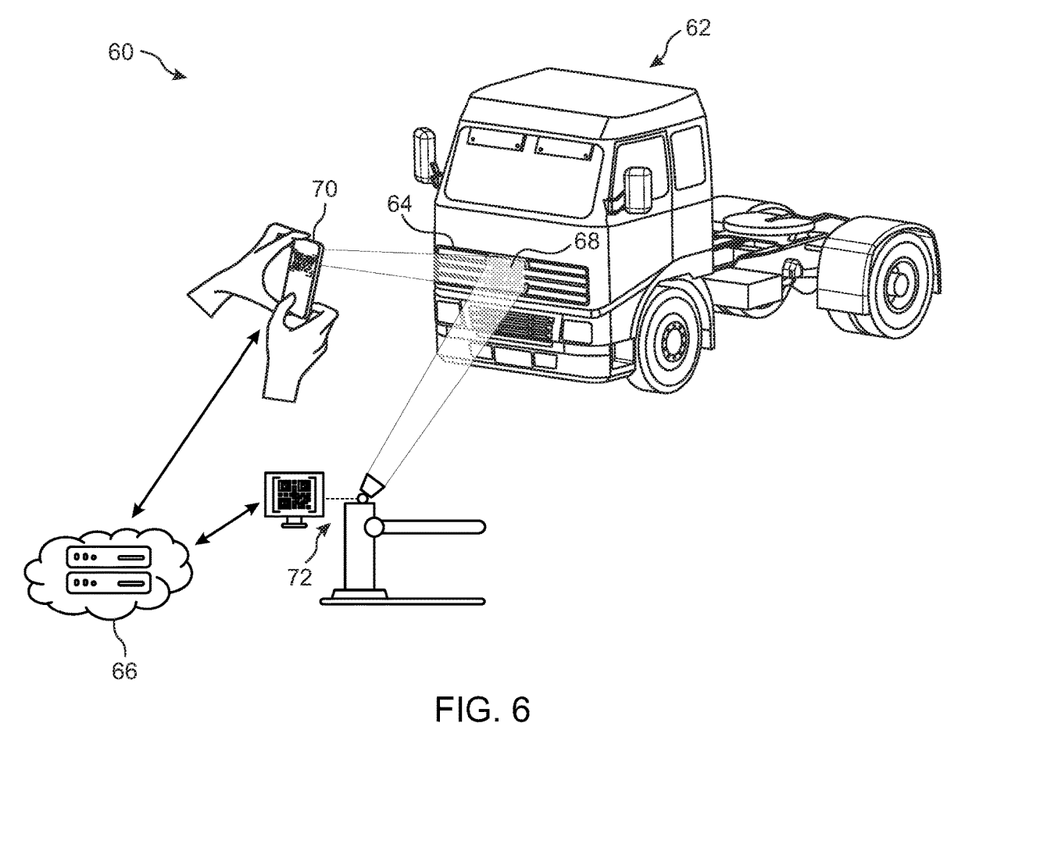
FIG. 6 illustrates a data access system according to one example of this disclosure.

FIG. 6 illustrates a data access system 60 according to one example of this disclosure. The data access system 60 comprises a vehicle 62 having a vehicle grill 64 in accordance with this disclosure, such as the vehicle 1 illustrated in FIG. 1 (but can also be implemented for vehicle 1a in FIG. 2 and for other examples). The data access system 60 also comprises a remote server 60 containing data associated with said vehicle 62. Such data may, for instance, be a user guide, vehicle identification number, web store data, or any other type of data that you may wish to associate with the vehicle 62 and allow it to become accessible by scanning a scannable matrix structure 68 of the vehicle grille 64.

The data may suitably be accessible by a camera-equipped communication device, such as a mobile phone 70, tablet, or other type of movable scanning equipment. However, as illustrated in FIG. 6, such a camera-equipped communication device may also be a stationary device 72, such as at a toll gate, workshop entrance, etc. Such a stationary device 72 may thus be regarded as a local scanning device which is configured to scan the scannable matrix structure 68 upon arrival of the vehicle 62 to the local scanning device.

The communication device or the local scanning device may, for instance, have an external camera operatively connected to the connection device. Regardless of the communication device being mobile or stationary, it may by means of its internal or external camera scan the scannable matrix structure 68 as illustrated in FIG. 6 and thereby be guided to the data stored in the remote server 66. For instance, the code pattern of the scannable matrix structure 68 may be coded for a website redirection or to a database redirection.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A vehicle grille configured to be mounted to a front of a vehicle body, wherein the vehicle grille comprises a grating structure through which air is receivable into the vehicle, wherein at least a portion of said grating structure is shaped as a scannable matrix structure forming a code pattern, and wherein said grating structure is formed by differently inclined surfaces such that when the inclined surfaces are illuminated, surfaces that are inclined at a first angle are seen as light parts of the code pattern, while surfaces inclined at a different second angle are seen as dark parts of the code pattern.

2. The vehicle grille according to claim 1, wherein the grille has a back side intended to face inwardly towards the vehicle when mounted on a vehicle, and a front side intended to face in the opposite direction, forwardly away from the vehicle, wherein said inclined surfaces are configured to present said light and dark parts of the code pattern when the front side of the grille is illuminated by natural or artificial light.

3. The vehicle grille according to claim 1, wherein the grating structure comprises a pattern of openings through which air can pass and closed areas through which air cannot pass, wherein one of said openings and said closed areas form light parts of the code pattern, while the other one of said openings and said closed areas form dark parts of the code pattern.

4. The vehicle grille according to claim 1, wherein said grating structure comprises a plurality of exchangeable, removable, or rearrangeable polygonal elements enabling the scannable matrix structure to be modified to form a different code pattern.

5. The vehicle grille according to claim 4, wherein said polygonal elements are in the form of square-shaped tiles fitted to mating receiving areas of the grating structure.

6. The vehicle grille according to claim 4, wherein said polygonal elements cover some of a pattern of openings to form closed areas, wherein said polygonal elements are removable to turn closed areas into openings or rearrangeable to turn openings into closed areas.

7. The vehicle grille according to claim 1, wherein said scannable matrix structure is in the form of a QR code pattern.

8. A vehicle comprising a vehicle grille, wherein the vehicle grille is configured to be mounted to a front of a vehicle body, wherein the vehicle grille comprises a grating structure through which air is receivable into the vehicle, wherein at least a portion of said grating structure is shaped as a scannable matrix structure forming a code pattern, and wherein said grating structure is formed by differently inclined surfaces such that when the inclined surfaces are illuminated, surfaces that are inclined at a first angle are seen as light parts of the code pattern, while surfaces inclined at a different second angle are seen as dark parts of the code pattern.

9. The vehicle according to claim 8, comprising, at the front of the vehicle, left and right vehicle lights, wherein said grille is centred at the front of the vehicle between said left and right vehicle lights, wherein the vehicle further comprises a light guide for guiding light from at least one of said left and right vehicle lights to said grating structure of the grille so as to illuminate said grating structure.

10. The vehicle according to claim 9, wherein said light guide is configured to direct light to different discrete areas of the grating structure, wherein areas receiving light by the light guide form light parts of the code pattern, while other areas not receiving light by the light guide form dark parts of the code pattern.

11. A data access system, comprising:
a vehicle including a vehicle grille, wherein the vehicle grille is configured to be mounted to a front of a vehicle body, wherein the vehicle grille comprises a grating structure through which air is receivable into the vehicle, wherein at least a portion of said grating structure is shaped as a scannable matrix structure forming a code pattern, and wherein said grating structure is formed by differently inclined surfaces such that when the inclined surfaces are illuminated, surfaces that are inclined at a first angle are seen as light parts of the code pattern, while surfaces inclined at a different second angle are seen as dark parts of the code pattern, and
a remote server containing data associated with said vehicle, said data being accessible by a camera-equipped communication device when scanning said scannable matrix structure.

12. The data access system according to claim 11, further comprising a local scanning device wherein the local scanning device is configured to scan said scannable matrix structure upon arrival of the vehicle to the local scanning device, thereby providing access to said data associated with said vehicle.

* * * * *